US012791504B2

(12) United States Patent
Van Den Wyngaert

(10) Patent No.: US 12,791,504 B2
(45) Date of Patent: Nov. 10, 2026

(54) METHOD AND APPARATUS FOR INDIRECT DETERMINATION OF THE DEW POINT OF COMPRESSED AIR

(71) Applicant: ATLAS COPCO AIRPOWER, NAAMLOZE VENNOOTSCHAP, Wilrijk (BE)

(72) Inventor: Thomas Van Den Wyngaert, Wilrijk (BE)

(73) Assignee: ATLAS COPCO AIRPOWER, NAAMLOZE VENNOOTSCHAP, Wilrijk (BE)

(*) Notice: Subject to any disclaimer, the term of this patent is extended or adjusted under 35 U.S.C. 154(b) by 245 days.

(21) Appl. No.: 18/698,321

(22) PCT Filed: Oct. 17, 2022

(86) PCT No.: PCT/IB2022/059929
§ 371 (c)(1),
(2) Date: Apr. 3, 2024

(87) PCT Pub. No.: WO2023/073493
PCT Pub. Date: May 4, 2023

(65) Prior Publication Data

US 2024/0402110 A1 Dec. 5, 2024

(30) Foreign Application Priority Data

Oct. 26, 2021 (BE) .................................. 2021/5834

(51) Int. Cl.
*G01N 25/70* (2006.01)
*G01N 25/62* (2006.01)
(Continued)

(52) U.S. Cl.
CPC ............. *G01N 25/70* (2013.01); *G01N 25/62* (2013.01); *G01N 25/66* (2013.01); *G01N 27/223* (2013.01)

(58) Field of Classification Search
CPC ...... G01N 25/70; G01N 25/62; G01N 27/223; G01N 25/66
See application file for complete search history.

(56) References Cited

U.S. PATENT DOCUMENTS 5,644,080 A * 7/1997 Stormbom ............. G01N 25/66 73/170.26
2002/0005068 A1* 1/2002 Libbrecht .............. G01N 25/68 73/335.04
(Continued)

FOREIGN PATENT DOCUMENTS

CN 202676648 U * 1/2013
CN 107907570 4/2018
(Continued)

OTHER PUBLICATIONS

Translation of JP2007114166A.*
(Continued)

*Primary Examiner* — Mirellys Jagan
(74) *Attorney, Agent, or Firm* — HSML P.C.

(57) ABSTRACT

An apparatus for indirectly determining the dew point of compressed air at a particulate operating pressure including a capacitive sensor for measuring a relative humidity, a heating element for both heating and cooling a fraction of the compressed air, a controller for controlling the heating element based on a measured relative humidity, a temperature sensor for determining the temperature of the fraction. The controller is further configured to control the heating element such that the fraction is maintained at a predeter-
(Continued)

mined constant relative humidity such that the dew point can be determined based on the temperature of the fraction.

11 Claims, 3 Drawing Sheets

(51) Int. Cl.
*G01N 25/66* (2006.01)
*G01N 27/22* (2006.01)

(56) References Cited

U.S. PATENT DOCUMENTS

| | | | | |
|---|---|---|---|---|
| 2005/0247107 | A1 | 11/2005 | Speldrich et al. | |
| 2011/0094292 | A1 | 4/2011 | Liu | |
| 2017/0138874 | A1 * | 5/2017 | Doucet | G01N 25/68 |
| 2021/0190716 | A1 | 6/2021 | Shiraki | |

FOREIGN PATENT DOCUMENTS

| | | | | | |
|---|---|---|---|---|---|
| CN | 111551586 | | | 8/2020 | |
| CN | 111551586 | A | * | 8/2020 | G01N 25/70 |
| CN | 107907570 | B | * | 11/2020 | G01N 25/70 |
| JP | 2007114166 | | | 5/2007 | |
| JP | 2007114166 | A | * | 5/2007 | |
| WO | 0142776 | | | 6/2001 | |

OTHER PUBLICATIONS

International Search Report for PCT/IB2022/059929 mailed Jan. 30, 2023, 4 pages.
Written Opinion for PCT/IB2022/059929 mailed Jan. 30, 2023, 7 pages.
Search report for BE2021/5834 dated Jun. 14, 2022, 11 pages.
The United Arab Emirates First Examination Report issued in UAE Application No. P2024-00971, dated Feb. 22, 2026, 5 pages.
Korean Office Action issued in KR Application No. 10-2024-7016704, dated Jun. 17, 2026, 10 pages, partial English translation provided.

* cited by examiner

METHOD AND APPARATUS FOR INDIRECT DETERMINATION OF THE DEW POINT OF COMPRESSED AIR

TECHNICAL AREA

The present invention is in the field of determining a dew point of air, and more specifically determining the dew point of compressed air produced by a compressor.

STATE OF THE ART

Compressed air is air produced by compressing air by a compressor. It is used in a variety of applications, such as, for instance, to power machines and tools, to clean parts by blowing, to inflate tires, and so on. Furthermore, it can also be used for medical purposes such as respiration or in the food industry.

Depending on the intended application, strict quality requirements will be imposed in terms of the moisture content in the compressed air, expressed as function of the dew point. The dew point is the temperature at which the air can no longer hold its water vapor and water droplets begin to form. In other words, the dew point of (unsaturated) air is the temperature to which that air must be cooled, at the same vapor pressure, such that the air becomes saturated with water vapor and dew forming is occurring.

To check if the compressed air meets certain quality requirements, the dew point is measured. There are two methods known in the art for measuring the dew point.

On the one hand, there is the so-called mirror method, in which a fraction of the compressed air is allowed to condense by cooling a mirror. The temperature of the mirror at the moment condensation occurs, then corresponds to the dew point of the compressed air. This method is described, inter alia, in US19480035275.

Although the accuracy of this method is high, a first drawback is that impurities of the mirror negatively affect this accuracy. As a result, the apparatus equipped with such a mirror must be recalibrated at regular intervals by either warming it up, cleaning it completely, or a combination of both. Another disadvantage is that determining the moment of condensation must be done visually. Although this can be done automatically, for example via laser technology, it increases the complexity of the apparatus. Consequently, this method is not always efficient from an economic point of view.

Alternatively, the dew point can be determined by determining the relative humidity of the compressed air by means of a capacitive humidity meter, as disclosed in WO0142776. Such a humidity meter comprises a capacitive sensor comprising electrodes wherein the impedance between two electrodes is proportional to the relative humidity. The dew point can then be determined on the basis of this relative humidity and the temperature. This determination can be made on the basis of a psychrometric diagram, via conversion formulas, and/or via look-up tables.

The dew point can also be determined via a capacitive sensor based on the charging and discharging frequency of a capacitor, which is a measure of the relative humidity.

Although this capacitive dew point measurement relatively simple and thus inexpensive, the disadvantage is that it has a low accuracy. In addition, the accuracy decreases, or in other words, the measurement error increases, as the relative humidity decreases. However, since users of compressed air in many cases impose a low relative humidity as a quality requirement, this method is not always efficient from a technical point of view.

Consequently, there is a need for an improved method for measuring the dew point of compressed air with a low relative humidity.

SUMMARY OF THE INVENTION

It is an object of the present invention to provide a method and apparatus for accurately determining the dew point of compressed air and which overcomes the above identified drawbacks.

This object is achieved, according to a first aspect of the invention, by providing a method according to claim 1.

The invention comprises a method for indirectly determining the dew point of compressed air at a particulate operating pressure using a capacitive sensor configured to measure a relative humidity, the method comprising iteratively repeating the steps of separating a fraction of the compressed air, measuring the relative humidity of the fraction using the capacitive sensor, changing the temperature of the fraction such that it is maintained at a predetermined constant relative humidity, measuring the temperature of the fraction, and determining the dew point based on the temperature.

The separated fraction of air is a fraction representative of the compressed air for which the dew point has to be determined. For example, it is separated in a space, such as a cavity or a hollow in which a fraction of the compressed air is passively refreshed on a regular basis. In other words, the fraction remains representative of the properties of the compressed air by iteratively repeating the following steps of the method.

The next step is measuring the relative humidity of this fraction, and therefore representative of the relative humidity of the compressed air itself. The measurement is done by a capacitive sensor as known in the art. This measurement can therefore be performed in a quick and simple manner.

In a next step of the invention, the temperature of the fraction is then changed in a continuous manner. In other words, the fraction is either heated or cooled depending on the desired result as discussed further below.

Controlling the changing the temperature, and thus the desired result, is determined by the measurement of the relative humidity. The purpose of changing the temperature is to maintain the relative humidity of the fraction at a constant value. In other words, the set value for a controller that controls the temperature change, is a predetermined constant relative humidity, while the measurement value originates from the capacitive sensor.

When the compressor runs in a stationary regime, the quality requirements, and thus the properties that describe the compressed air in terms of, i.a. the dew point, converge to a constant value. The temperature at which the fraction is maintained, will then also converge to a fixed value in terms of a controlled dynamic system.

Furthermore, it should thus be understood that this fixed value may exhibit fluctuations as known by those skilled in the art of control technology in order to manage a dynamic system on the basis of measurements.

Subsequently, the temperature of the fraction that serves as the basis for determining the dew point, is measured.

Determining the dew point on the basis of the temperature can then be done on the basis of a conversion formula, a look-up table, or by determining thereof on a psychrometric diagram. In this way, the dew point is then indirectly determined.

Note that by cooling or heating the fraction, the temperature changes, but not the dew point thereof. This can be explained by a psychrometric diagram. When there is no moisture supply or decrease and at constant pressure, heating or cooling can be represented as a horizontal line on such a psychrometric diagram, wherein horizontal lines correspond to air of equal dew points.

An advantage of this method is that the dew point can be determined in an economically efficient manner by using a capacitive sensor, while avoiding disadvantages such as low accuracy in measurements at low relative humidity levels. For example, the predetermined constant relative humidity can be set to a value corresponding to a lowest measurement error—or highest measurement accuracy—of the sensor. Technical documentation of capacitive sensors has shown that this value is preferably equal to a relative humidity of 15% or a higher value.

The predetermined constant relative humidity can also be set according to the technical specifications of the compressor. In other words, at a value where it can be expected that the temperature of the fraction will have to be changed minimally to maintain its relative humidity at a constant value.

Changing the temperature of the fraction can be done by using a Peltier element. A Peltier element, also called a passive thermoelectric element or Peltier-Seebeck element, is a heating element or electrical component to move heat from a cold to a warm location and/or in the opposite direction. Thus, the temperature of the fraction can be changed, in other words heated or cooled.

The Peltier element will then be controlled by a controller whose set value is the predetermined constant relative humidity. This controller can be, for example, a PID controller, or any other controller suitable for controlling the Peltier element, and further suitable for keeping the fraction at a constant relative humidity.

According to a second aspect of the invention, there is provided an apparatus according to claim 6.

The invention further comprises an apparatus for indirectly determining a dew point of compressed air at a particulate operating pressure, the apparatus comprising a capacitive sensor configured to measure a relative humidity, a heating element configured to both heat and cool a fraction of the compressed air, a controller configured for controlling the heating element based on a measured relative humidity, a temperature sensor for determining the temperature of the fraction, and wherein the controller is further configured to control the heating element such that the fraction is maintained at a predetermined constant relative humidity such that the dew point can be determined based on the temperature of the fraction.

According to one embodiment, the apparatus further comprises a small cavity or hollow arranged on an outside of the sensor housing, through which then the compressed air can contact the active part of the capacitive sensor.

Furthermore, according to an embodiment, the heating element may be in direct contact with the capacitive sensor. In other words, the heating element and the capacitive sensor form a thermal contact such that not only the fraction is cooled and/or heated, but also the sensor itself in a direct manner. As a result, a thermal equilibrium will be reached more quickly between the fraction and the sensor and thus a higher accuracy of the measurement can be achieved more quickly.

The dew point can be determined by reading the temperature from the apparatus and then processing this reading via an external computer. According to one embodiment, the apparatus may further comprise a processing unit configured to calculate the dew point itself based on the temperature. In this way, a user can then read the dew point directly from the apparatus, or this direct calculation can be used further to control other apparatuses, such as the compressor itself, to meet the imposed quality requirements.

Furthermore, the central processing unit can be configured to determine the dew point by means of a look-up table. This reduces the complexity of the central processing unit and thus also the energy required to perform calculations.

BRIEF DESCRIPTION OF THE DRAWINGS

The invention will now be further described with reference to the drawings in which.

DESCRIPTION OF EMBODIMENTS

Figure 1:
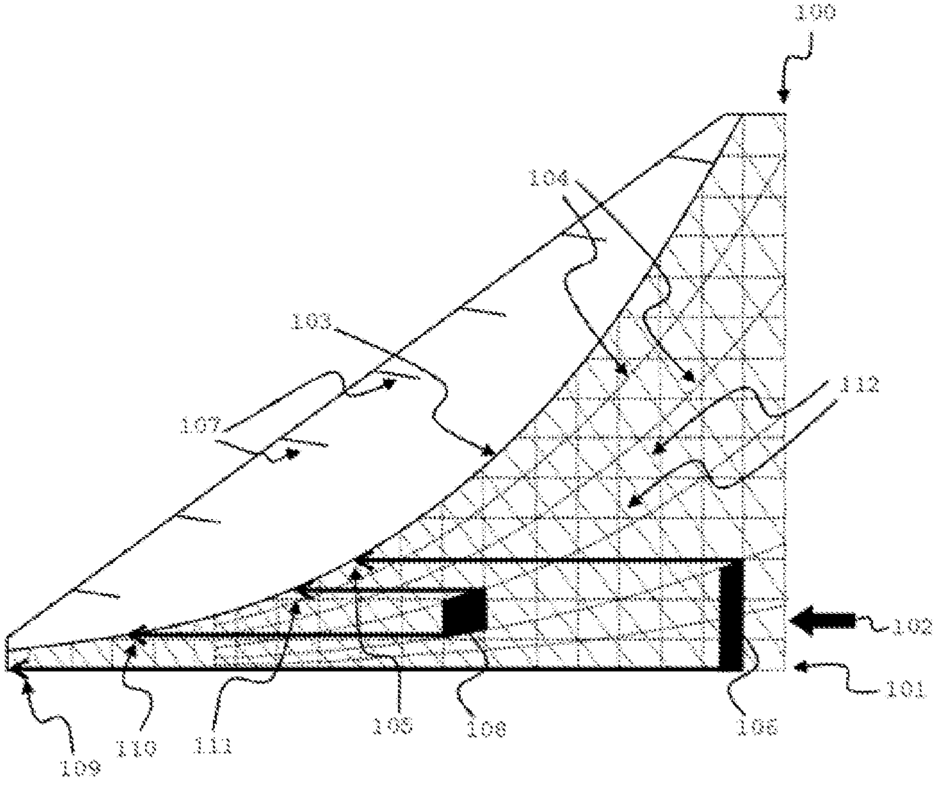
FIG. 1 illustrates a psychrometric diagram.

FIG. 1 illustrates a psychrometric diagram at a particular pressure. The state of air at a certain pressure can be read on a psychrometric diagram. This condition comprises, in addition to pressure, wet bulb temperature, dry bulb temperature, dew point, relative humidity, humidity ratio, specific enthalpy, and specific volume.

The dry bulb temperature can be read on the horizontal axis 101. The humidity ratio can be read on the vertical axis 100. The leftmost curve 103 represents the saturation curve. On this saturation curve, the wet bulb temperature and dew point always correspond to the dry bulb temperature. The other curves 104 illustrate relative humidity. Furthermore, the lines 107 illustrate the specific enthalpy. The wet bulb temperature can be read on the oblique lines 112.

Furthermore, the state of a particular fraction of air corresponds to a unique point in the psychrometric diagram.

Furthermore, in FIG. 1, an illustration is made of a fraction of air whose state is to be determined in terms of the above characteristics. It is assumed that the fraction of air has a humidity ratio corresponding to the value indicated by the arrow 102. It is from this fraction of air with humidity ratio 102 that the dew point is to be determined. Note that the dew point can be read on the saturation curve 103.

If there is a relatively high measurement error for both the measurement of the relative humidity and the temperature, a zone 106 exists that corresponds to a possible measurement zone. For the fraction of air 102, it is then possible to measure a dew point using the points 105 and 109 as margin. If the temperature of the fraction is lowered, thus simultaneously reducing the measurement error of the sensor because the relative humidity increases, the measurement zone is 108. The limits of determining the dew point then correspond to points 110 and 111, which is a smaller margin than the one determined by points 105 and 109.

Figure 2:
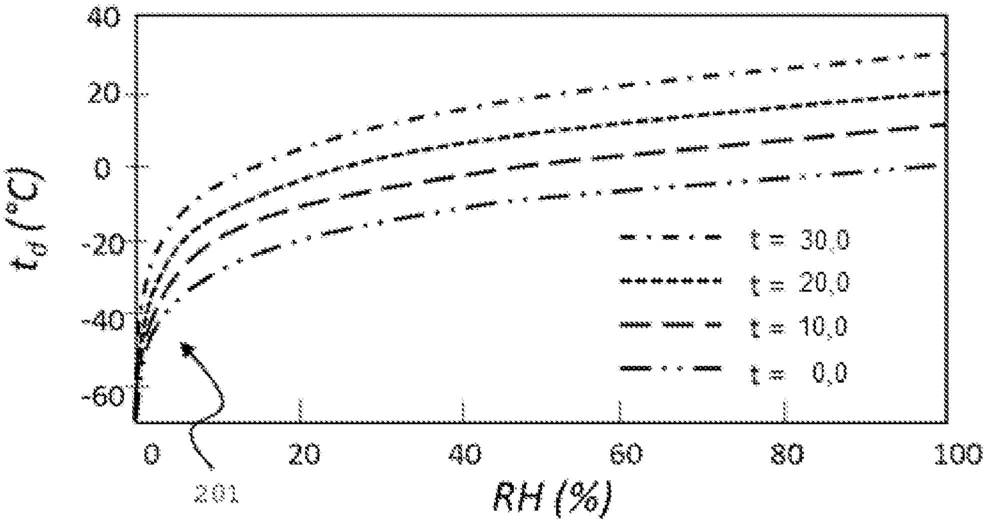
FIG. 2 illustrates the dew point as function of the relative humidity with different air temperatures as a parameter.

Furthermore, FIG. 2 illustrates the dew point as function of the relative humidity with different air temperatures as a parameter. The relative humidity RH is expressed as a percentage on the horizontal axis, and the dew point is expressed in degrees Celsius on the vertical axis. Furthermore, four curves are illustrated with temperatures of thirty, twenty, ten, and zero degrees Celsius, respectively. It can be noted from this figure that in the area 201, hence with a low relative humidity, the dew points converge towards each other for the different temperatures. It can therefore be concluded that low relative humidity levels are difficult to measure.

Figure 3:
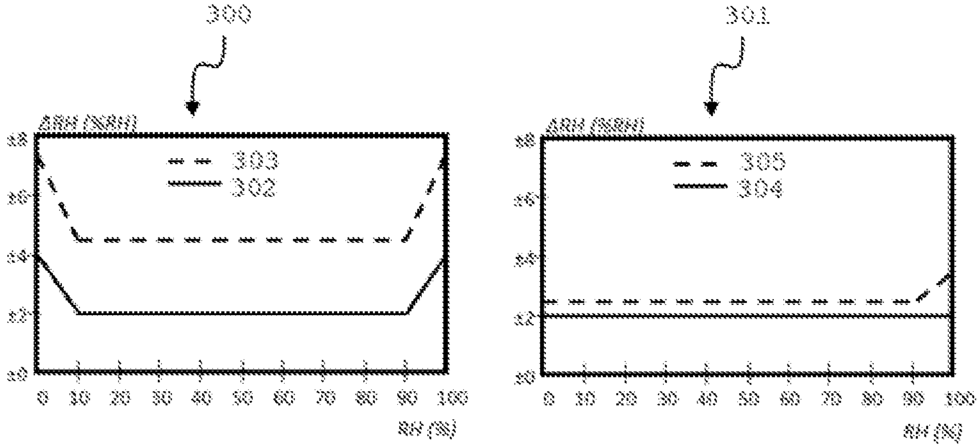
FIG. 3 illustrates technical specifications comprising the measurement accuracy of two capacitive sensors.

FIG. 3 illustrates technical specifications comprising the measurement accuracy of two capacitive sensors 300 and 301. The dotted lines 303 and 305 illustrate the maximum measurement error and the solid lines 302 and 304 the standard measurement error, both as function of the relative humidity. In other words, on the horizontal axis, the relative humidity RH (%) is illustrated and on the vertical axis, the measurement deviation ΔRH (% RH) as function of the relative humidity is illustrated.

In the illustration of FIG. 3, and more particularly that of sensor 300, it can be noted that at very low values of relative humidity, the measurement error is large. Below the value of 10% RH, the standard measurement error increases from 2% to 4%, and the maximum measurement error increases from 4% to 8%. It should also be noted that for high values of the relative humidity, the measurement error also increases. At a relative humidity from a value of 90% at sensor 300, the standard and maximum measurement error also increase from 2% to 4%, and from 4% to 8%, respectively. At sensor 301, the maximum measurement error increases from 2.5% to 4% at a relative humidity greater than 90%.

The value of the predetermined constant relative humidity will thus depend on the type of sensor, and more particularly on the technical specifications comprising the measurement accuracy. The imposed quality requirements of the compressed air, the specifications of the compressor, and the measuring accuracy of the sensor shall be taken into account in order to set this value of constant relative humidity.

Figure 4:
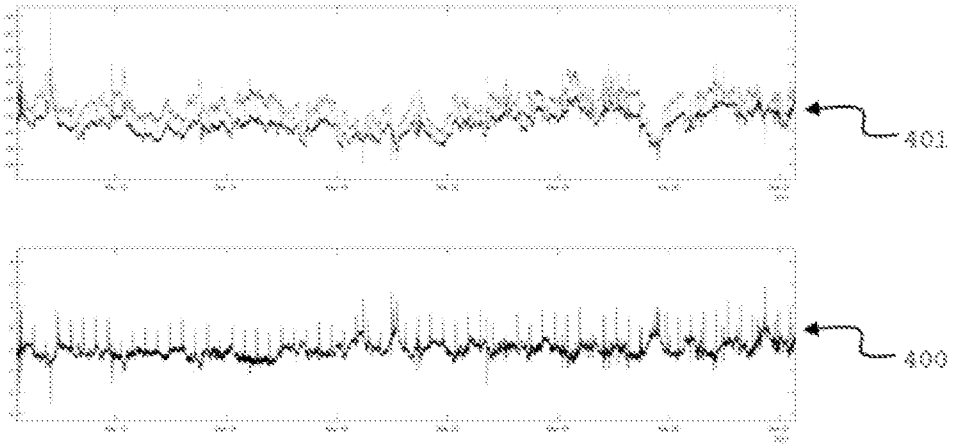
FIG. 4 illustrates measurement results of measurements performed by the apparatus of the invention versus a capacitive sensor.

Furthermore, FIG. 4 illustrates measurement results of measurements performed by the apparatus of the invention versus measurements performed by a mirror dew point sensor that directly measures relative humidity. The measurements were carried out over a period of several days. Graph 401 illustrates these measurements, in which the solid black line illustrates the measurements from the apparatus of the invention, and the grey line illustrates measurements from a mirror dew point sensor with direct measurement of the dew point.

Furthermore, graph 400 illustrates the difference between both measurements. It should be noted that the average is located between a deviation of zero and minus two degrees Celsius.

Figure 5:
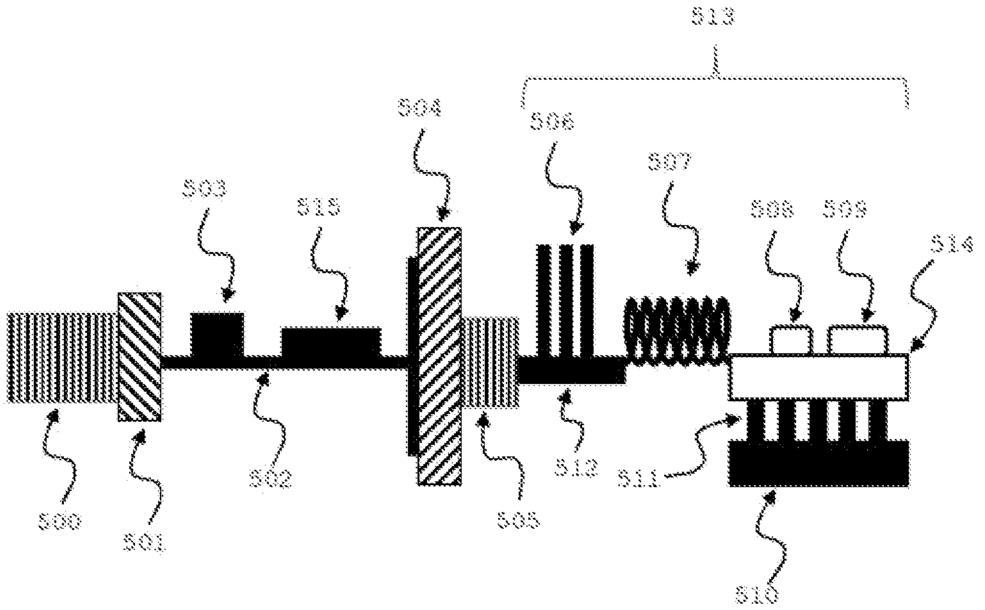
FIG. 5 illustrates an embodiment of the apparatus of the invention.

FIG. 5 illustrates an embodiment of the apparatus of the invention. The apparatus comprises a CAN interface with power supply 500 for external communication. The CAN interface 500 is threaded and further comprises a hexagonal nut 501. Furthermore, the thread and nut 501 are suitable for externally connecting the apparatus to another apparatus via the CAN interface 500.

Furthermore, the apparatus comprises a control board 502 and a transformer 503 to convert an electrical voltage from the CAN interface 500 into a suitable voltage for the sensor and the control thereof, as well as the Peltier element.

The portion or space, such as a cavity or a hollow, 513 of the apparatus according to this embodiment comprises a capacitive sensor 508, a temperature sensor 509, a Peltier element 510, a controller 512 for the Peltier element 510, electrical connections 507 between the controller 512 and the sensors 508, 509 and the Peltier element 510, and a cooling fin 506 to cool the power supply that controls the Peltier element 510 when a lot of power is to be directed.

Furthermore, the apparatus comprises an airtight connection 504 between the control board 502 and the portion 513 of the apparatus. This allows the measurements to be performed without ambient air influencing them. Furthermore, the apparatus comprises threads 505 to durably attach the portion 513.

Furthermore, the sensors 508, 509 are mounted on a holder 514 which is in direct contact with the Peltier element 510 via the ribs 511, which form part of the Peltier element 510. The material of the holder 514 and the ribs 511 then preferably have a high thermal conductivity, such that the Peltier element 510 can efficiently and quickly cool or heat the sensors 508, 509.

Furthermore, the apparatus may comprise a processing unit 515 to calculate the dew point. This can be done on the basis of a pre-programmed look-up table, in which case the temperature, as the only variable, uniquely corresponds to a dew point, such that little computing power is required.

To increase the accuracy, the processing unit 515 may be further configured to calculate the dew point via the following conversion formula, $$X = 1 - (0{,}01 \times RH)$$

$$K = -(14{,}55 + 0{,}114 \times T_c) \times X - ((2{,}5 + 0{,}007 \times T_c) \times X)^3 - (15{,}9 + 0{,}117 \times T_c) \times X^{14}$$

$$T_d = (K \times 1{,}8) + 32$$

where RH is the relative humidity, $T_c$ the measured temperature, and $T_d$ the calculated dew point. For the value of RH, the predetermined constant relative humidity can then be chosen as the value, or a measured value from the sensor can be used in order to increase the accuracy.

The present invention is by no means limited to the embodiments described by way of example and shown in the figures, but a method and apparatus according to the invention can be realized in all kinds of shapes and dimensions without departing from the scope of the invention.

The invention claimed is:

1. A method for indirectly determining a dew point of compressed air at a particulate operating pressure using a capacitive sensor configured to measure a relative humidity, the method comprising iteratively repeating the steps of:

separating a fraction of the compressed air;

measuring the relative humidity of the fraction using the capacitive sensor;

continuously changing a temperature of the fraction by heating or cooling the fraction until the fraction is maintained at a predetermined constant relative humidity; and measuring the temperature of the fraction;

wherein the dew point is determined based only on the temperature.

2. The method according to claim 1, wherein the predetermined constant relative humidity comprises a value corresponding to a lowest measurement error of the capacitive sensor.

3. The method according to claim 1, wherein the predetermined constant relative humidity comprises at least a value of 15%.

4. The method according to claim 1, wherein changing of the temperature is done by means of a Peltier element.

5. The method according to claim 4, wherein the Peltier element is controlled by means of a PID controller.

6. An apparatus for indirectly determining a dew point of compressed air at a particulate operating pressure, comprising:

a capacitive sensor configured to measure a relative humidity of a fraction of the compressed air;

a heating element configured to both heat and cool the fraction of the compressed air;

a controller configured for controlling the heating element based on the measured relative humidity; and a temperature sensor for determining a temperature of the fraction;

wherein the controller is further configured to control the heating element to continuously change the temperature of the fraction by heating or cooling until the fraction is maintained at a predetermined constant relative humidity and configured to determine the dew point based only on the temperature of the fraction.

7. The apparatus according to claim 6, wherein the capacitive sensor comprises a cavity for isolating the fraction.

8. The apparatus according to claim 6, wherein the heating element is in direct thermal contact with the capacitive sensor.

9. The apparatus according to claim 6, wherein the heating element comprises a Peltier element.

10. The apparatus according to claim 6, further comprising a central processing unit configured to calculate the dew point based on the temperature.

11. The apparatus according to claim 10, wherein the central processing unit is further configured to determine the dew point by means of a look-up table.

* * * * *